United States Patent [19]

Liethen

[11] Patent Number: 5,435,268
[45] Date of Patent: Jul. 25, 1995

[54] MOLDED BIRD FEEDER AND METHOD OF MAKING SAME

[76] Inventor: Frederic J. Liethen, P.O. Box 296, Appleton, Wis. 54912

[21] Appl. No.: 277,214

[22] Filed: Jul. 19, 1994

[51] Int. Cl.⁶ ............................................. A01K 39/01
[52] U.S. Cl. .................................................. 119/57.8
[58] Field of Search ................... 119/52.2, 57.8, 57.9

[56] References Cited

U.S. PATENT DOCUMENTS

| | | | |
|---|---|---|---|
| 3,040,705 | 6/1962 | Schlitz | 119/57.8 X |
| 4,223,637 | 9/1980 | Keefe | 119/52.2 |
| 4,242,984 | 1/1981 | Smith | 119/52.2 |
| 4,966,098 | 10/1990 | Freeman | 119/52.2 |

OTHER PUBLICATIONS

Birding Concepts Product Brochure, Wild Bird Feeders, published Jun. 1, 1994, pp. 1 and 11.

Primary Examiner—Robert P. Swiatek
Attorney, Agent, or Firm—Andrus, Sceales, Starke & Sawall

[57] ABSTRACT

A tubular plastic bird feeder is made from a unitary blow molded enclosure which includes engageable thread patterns on one end cap and the adjacent end of the tubular body which are separated in molding by an integral annular sleeve. The sleeve is cut away circumferentially at both ends from the as-molded enclosure leaving a separated end cap which may be threaded onto the end of the tubular body. Similar integrally molded thread patterns may be formed on the lower end of the unitary enclosure to provide either a removable lower end cap or the facility to thread another tubular body onto the lower end of the first tubular body to provide an extended length feeder. The preferred embodiment also includes a circular barrier disc supported in the tubular body below the lowermost seed holes to prevent seed, and other particles from accumulating in the inaccessible lower end of the feeder. In lieu of conventional seed holes cut, punched or otherwise formed in the tubular body, the body may be formed in the blow molding process to include angled seed ports with protective deflector hoods.

13 Claims, 4 Drawing Sheets

MOLDED BIRD FEEDER AND METHOD OF MAKING SAME

BACKGROUND OF THE INVENTION

The present invention pertains to a tubular plastic bird feeder and, more particularly, to such a feeder of blow molded construction.

Bird feeders having long hollow tubular bodies are well known in the art. The bodies are typically made from transparent cylindrical tubing provided with opposite horizontally aligned hole pairs through which bird perches may be inserted. A seed port is typically provided for each end of each perch and a conventional feeder of, for example, fifteen inches to eighteen inches in length may be provided with three or four vertically spaced perches. The opposite ends of the tubular body are closed with plastic or metal end caps and the upper end cap, which is removable for refilling, typically includes a suitable hanger. The hanger may comprise a wire bail or hook, piece of cord, or an integrally formed hanging bracket. Some tubular plastic bird feeders also include separate hooded seed ports which are inserted in large openings in the tube wall to facilitate feeding and prevent loss of seed from the downwardly descending seed column.

Prior art tubular bird feeders therefore require a half dozen or more separate parts in the manufacture of the feeder, a number of which are typically made of metal. Often, the bottom end caps or closures are permanently affixed to the tubes and seed particles and dirt typically accumulate in the bottom where it is difficult to clean.

It would be desirable, therefore, to have a plastic tubular bird feeder which is of simple construction, having fewer component parts and made of less expensive plastic materials. It would also be desirable to provide such a feeder in which the accumulation of seeds, seed particles and debris in the bottom is inhibited or which is easily accessible for cleaning.

SUMMARY OF THE INVENTION

In accordance with the present invention, a blow molded bird feeder is provided which is of substantially simpler and less expensive construction than comparable tubular bird feeders, yet provides a number of significant improvements and benefits.

The molded plastic bird feeder of the present invention includes a unitary molded enclosure having a hollow tubular body and integral opposite end caps. The molded enclosure is formed with cooperating attachment means which are adapted to be separated after the unitary enclosure is molded to separate one end cap from the body. The attachment means allow the separated end cap to be demountably rejoined to and removed from the body, as for filling the feeder. The unitary enclosure is most preferably formed by blow molding and the attachment means preferably comprises mating screw threads which are formed in one of the end caps and in the tubular body. The attachment means may also comprise an annular sleeve which forms part of the unitary molded enclosure and joins the mating screw threads prior to separation. Alternately, the attachment means may comprise interengaging tabs and grooves in the end cap and in the body which are adapted to provide a snap fit connection therebetween.

One of the end caps also preferably includes a through hole which is disposed on the longitudinal axis of the tubular body and provides an opening for receipt of a hanger device. In the blow molded construction, the through hole comprises the supply hole for the gas used in the blow molding process.

In another embodiment, the tubular body includes annular rib means which are formed adjacent one end, and a circular disc is inserted in the tube and supported by the rib means to, in turn, provide support for a column of seed in the tubular body above the disc. The rib means may comprise a single rib extending radially into the tubular body and adapted to support the disc thereon, or may comprise a pair of ribs extending radially into the tubular body, which ribs are spaced to define an annular groove therebetween in which the disc is inserted with a snap-fit.

In another aspect of the invention, cooperating attachment means are provided between both end caps and the tubular body, so that, upon separation, one or both of the end caps may be replaced with another tubular body to provide an extended length feeder. The tubular body may also be molded to include integral seed ports. In one form, each seed port comprises a groove which is defined by an upper surface and a lower surface joined at their radially inner edges, with the upper surface comprising a seed deflector hood and the lower surface defining a knock-out portion which provides a seed port opening.

The present invention also includes a method for making a bird feeder which comprises the steps of: molding a unitary plastic enclosure which has a hollow tubular body and a pair of end caps, said tubular body and one end cap including molded attachment means; separating the end cap from the unitary enclosure; and engaging said attachment means to demountably attach the separated end cap to the tubular body. The molding step preferably comprises blow molding.

DETAILED DESCRIPTION OF THE PREFERRED EMBODIMENTS

Figure 1:
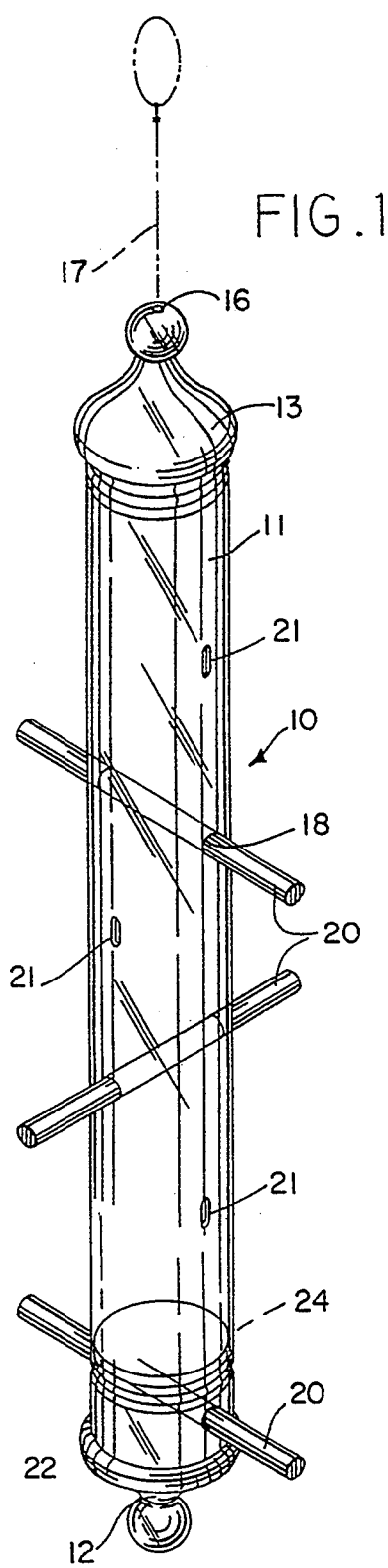
FIG. 1 is a perspective view of the bird feeder of the present invention.

Referring first to FIGS. 1–4, the preferred embodiment of the bird feeder 10 of the present invention will be shown in its completed and assembled form. The feeder is preferably formed by a blow molding process, which will be described later. Any suitable UV stabilized plastic material may be used, such as a transparent PVC.

The feeder 10 includes a hollow tubular body 11, and integral lower end cap 12 and a removable upper end cap 13. The upper end cap 13 is preferably demountably attached to the tubular body 11 by mating screw threads comprising an outer screw thread pattern 14 on the upper end of the tubular body and an inner screw thread pattern 15 on the lower end of the upper end cap 13. The thread patterns 14 and 15 are formed in the molding process to be described below. The upper end cap 15 is also provided with an axial through hole 16 to accommodate attachment of a hanging device, such as a cord or wire 17.

Figure 2:
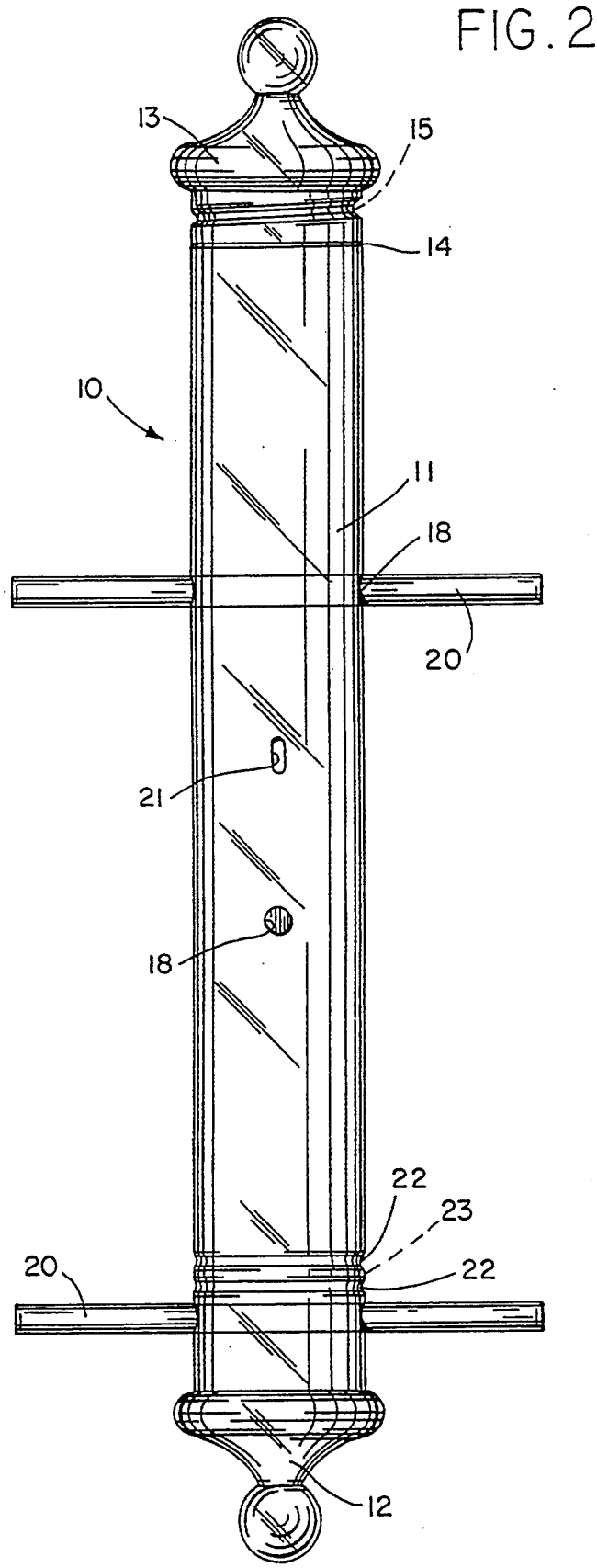
FIG. 2 is a side elevation of the bird feeder shown in FIG. 1.
Figure 4:
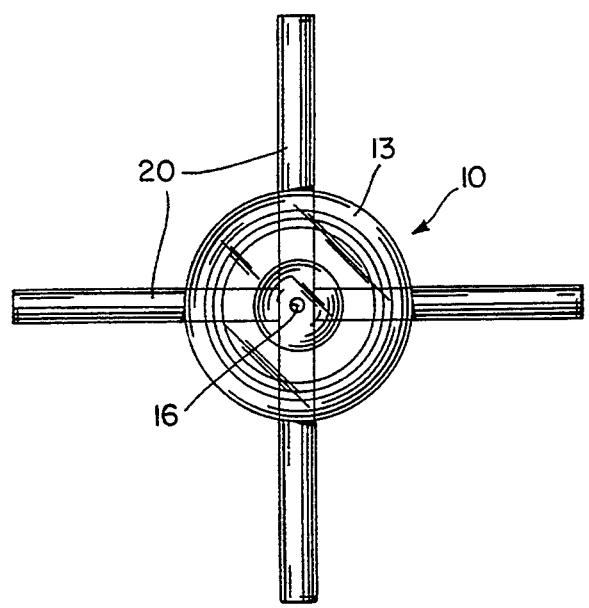
FIG. 4 is a top plane view of the bird feeder shown in FIGS. 2 and 3.
Figure 3:
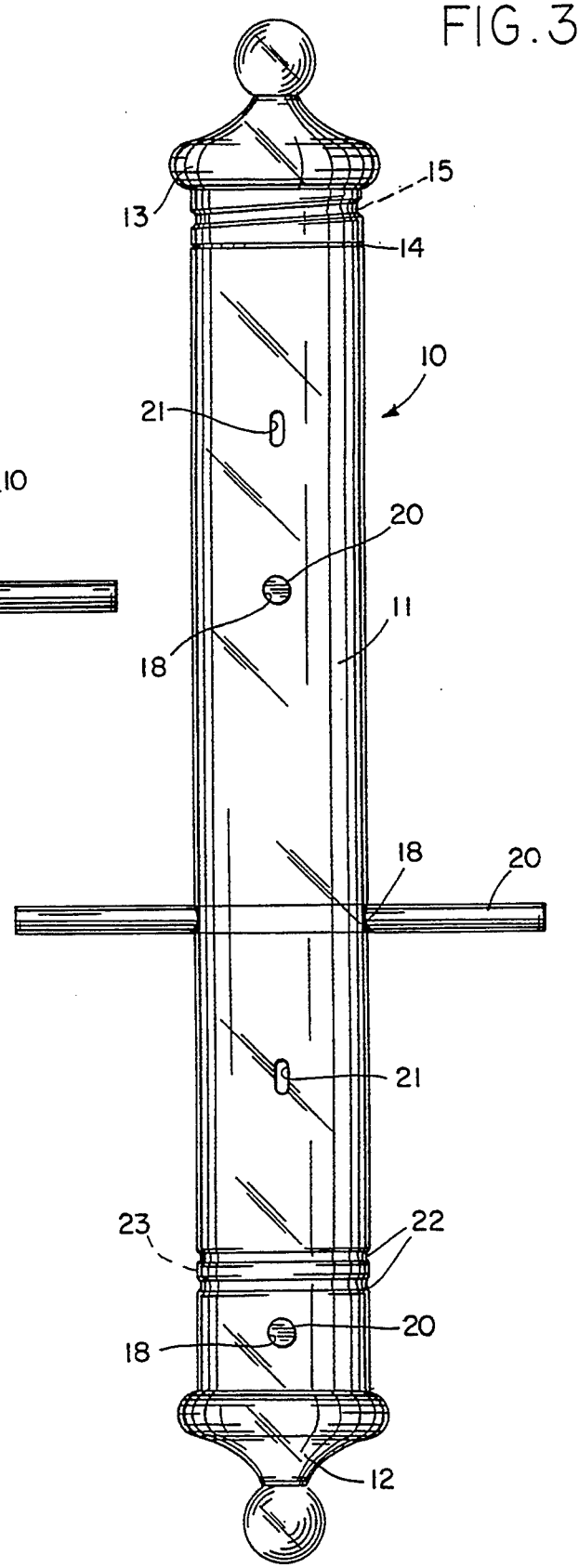
FIG. 3 is a side elevation of the bird feeder rotated 90° from the FIG. 2 view.

The tubular body 11 includes a series of horizontally aligned hole pairs 18, each pair adapted to receive a small diameter tube or rod 20 which is long enough to extend outwardly of the tubular body to form a bird perch on either side of the body. A pair of seed holes 21 is formed vertically above each perch hole pair 18 and may be suitably sized to accommodate different types of bird seed. As shown in FIGS. 1–3, vertically adjacent perch rods 20 are offset by 90°, such that in the particular feeder shown, the upper and lower perch rods are parallel to one another and the intermediate perch rod is perpendicular thereto.

Figure 8:
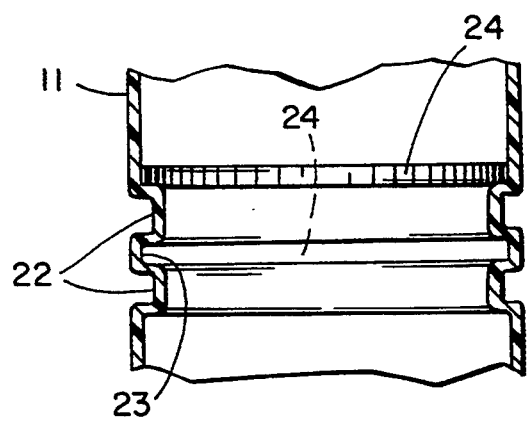
FIG. 8 is a partial sectional view showing the integrally molded ribs for supporting the closure disc for the lower end of the feeder.

Referring also to FIG. 8, the lower end of the tubular body 11, just above the lowermost hole pair 18 is provided with a pair of integrally molded annular ribs 22 formed to protrude radially inwardly. The ribs 22 are vertically spaced to define therebetween an annular groove 23. A small circular disc 24 of plastic or other suitable material is inserted into the open upper end of the tubular body 11 and allowed to drop and rest upon the upper annular rib 22, as best seen in FIGS. 1 and 8. The disc 24 supports the column of seed which fills the feeder and prevents seed, seed particles and dirt from entering the lower end of the tubular body and the hollow interior of the lower end cap 12 where it is wasted and accumulates and is difficult to clean out. Alternately, the upper annular rib 22 may be formed of a somewhat different shape including, for example, downwardly inclined surface portions, whereby the disc 24 could be forced downwardly past the upper annular rib to snap into the annular groove 23 above the lower rib. In this manner, the disc 24 would be held more securely in place. In lieu of the annular ribs 22, integrally molded, circumferentially spaced bosses could also be used to support the disc.

Figure 5:
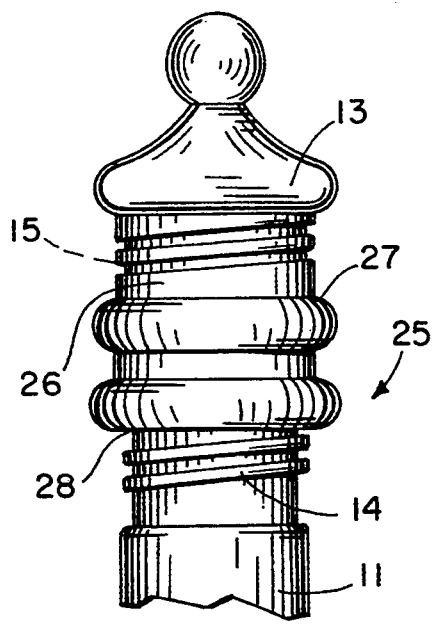
FIG. 5 is a side elevation of the upper end of the unitary enclosure from which the bird feeder is made prior to separating the end cap from the tubular body.
Figure 6:
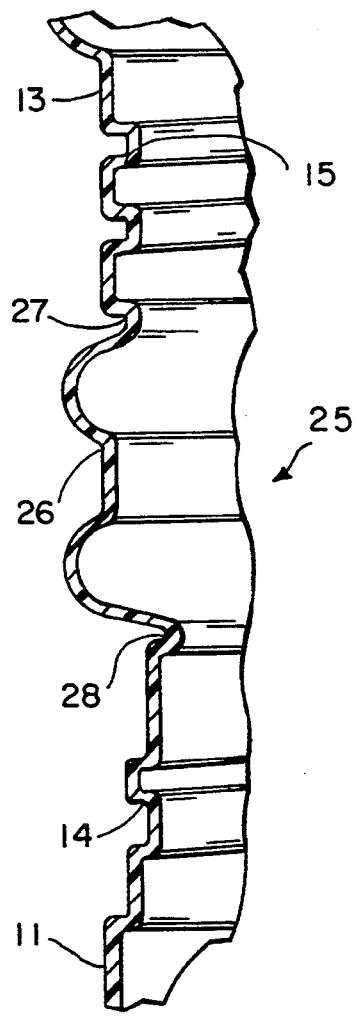
FIG. 6 is an enlarged partial sectional view of FIG. 5.
Figure 7:
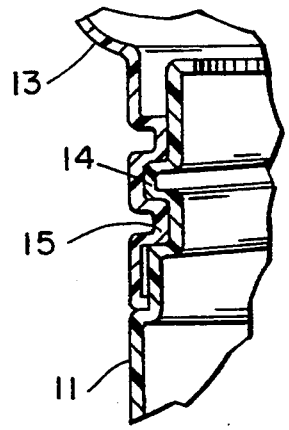
FIG. 7 is a partial sectional view after separation of the end cap and tubular body from the asmolded enclosure and after being attached together.

Referring also to FIGS. 5–7, the bird feeder 10 of the preferred embodiment is made from a unitary blow molded enclosure 25, the upper portion of which is shown in FIG. 5. The lower portion of the unitary enclosure 25 is as shown in the preceding drawings and includes the annular ribs 22 molded in the lower end of the tubular body and the integrally molded lower end cap 12. The as-molded enclosure 25 includes an annular sleeve 26 which separates the upper end cap 13 from the tubular body 11. The sleeve 26 is secured to the lower edge of the inner thread pattern 15 on the upper end cap along an annular seam 27. Similarly, the annular sleeve 26 is secured to the upper edge of the outer screw thread pattern 14 on the upper end of the tubular body by an integral annular seam 28, as best seen in FIG. 6. The body of the sleeve 26, between the upper and lower seams 27 and 28, is formed with a pair of large circular ribs 29, but the shape of the sleeve is not particularly important. The axial through hole 16 in the upper end cap 13 is formed in the blow molding process by the small tube through which gas is fed into the parison from which the enclosure is blow molded.

After the enclosure 25 has been formed, the sleeve 26 is cut away along both the upper seam 27 and the lower seam 28, leaving the separated upper end cap 13 which may be threaded onto the upper end of the tubular body 11 to close the bird feeder 10 as shown in FIG. 7.

Figure 11:
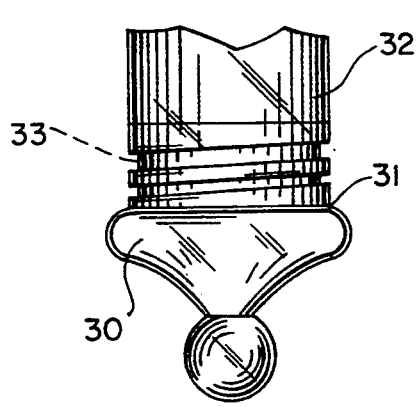
FIG. 11 is a side elevation view of the lower portion of a feeder showing an alternate embodiment of the end cap attachment means.
Figure 12:
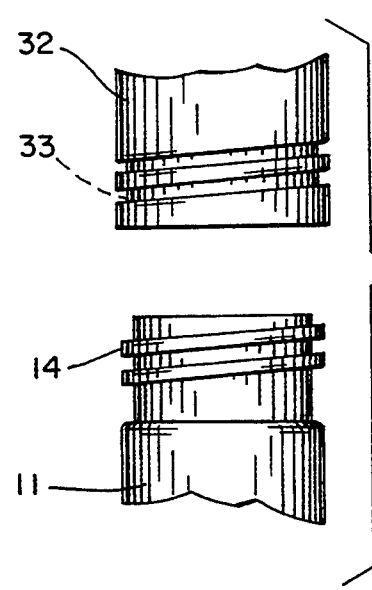
FIG. 12 is an exploded view showing the alternate attachment means of FIG. 11 used to interconnect two tubular bodies.

In an alternate embodiment, the unitary blow molded enclosure may be formed with a second annular sleeve (not shown) similar to the upper annular sleeve 26 to initially separate the lower end cap 12 from the lower end of the tubular body 11. Thus, as shown in FIGS. 11 and 12, a modified lower end cap 30 is formed with an integral outer thread pattern 31 and a modified tubular body 32 includes a molded inner thread pattern 33. When the annular sleeve is cut away (in the same manner as the upper annular sleeve 26 previously described), the modified lower end cap 30 may be threaded into the lower end of the modified tubular body 32, as shown in FIG. 11. In FIG. 12, the threaded upper end 14 of a previously described tubular body 11 or the threaded upper end of a modified tubular body 32 may also be threaded into the lower end of the modified tubular body 32 to provide an extended length bird feeder. If desired, of course, a slightly modified bird feeder could be made from the blow molded enclosure 25 of the preferred embodiment (FIG. 5) by inverting the same such that the removable end cap is the lower end cap 12 and the upper end cap 13 is formed to remain integral with the tubular body 11. The modified feeder would have to be inverted for filling, but would otherwise be made and assembled in the same manner previously described.

Instead of the threaded interconnections 14 and 15 or 31 and 33, the removable end cap and adjacent end of the tubular body could be molded to include means for providing a snap fit connection therebetween. For example, the cylindrical surface of the end cap could be provided with a number of integral tabs which project radially inwardly to cooperate with a mating series of grooves formed in the upper end of the tubular body and also projecting radially inwardly. As the cap is pushed axially onto the upper end of the tubular body, the tabs would snap into the grooves as a result of the inherent flexibility of the plastic material, which may have a thickness of, for example, 0.030 inch (0.76 mm).

Figure 9:
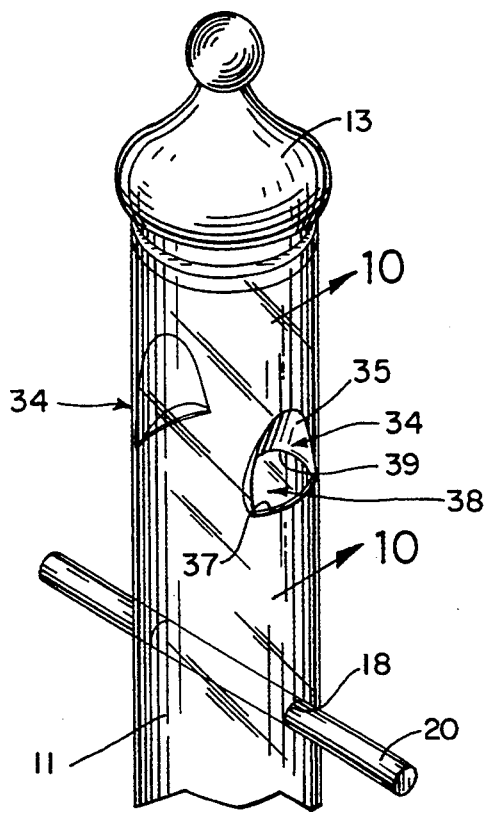
FIG. 9 is a perspective view of the upper end of feeder showing an alternate embodiment including integrally molded feed ports.
Figure 10:
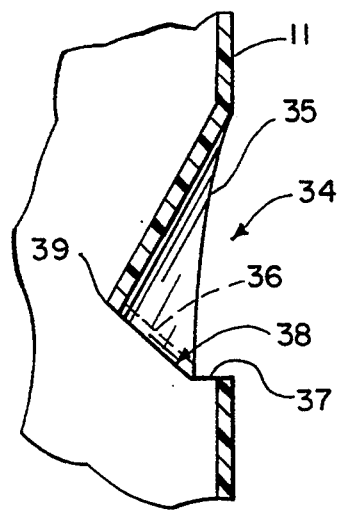
FIG. 10 is an enlarged partial sectional view taken along line 10—10 of FIG. 9.

A further embodiment of the invention is shown in FIGS. 9 and 10. The tubular body 11 may be formed in the blow molding process with indented portions or grooves 34. Each groove 34 is defined by a curved upper surface 35 and a flat lower surface 36 which are integrally joined at their radially inner edges along a curved edge 39. The lower surface 36 may be molded with a scored or otherwise weakened knock-out portion which, when removed after molding, provides a seed port opening 38. Alternately, as shown, the entire flat surface 36 may be cut out, along the curved inner edge 39 and a continuous circular edge 37. The downwardly inclined curved upper surface 35 provides a deflector hood so that seeds poured into the upper end of the tubular body or the descending column of seeds consumed by birds will not pass out of the seed port openings 38.

Although the various embodiments of the subject invention have been described to include a cylindrical tubular body 11, it should be understood that tubular bodies of any cross sectional shape may be utilized, including square, triangular, oblong and other shapes. All such shapes may be readily provided in the blow molded construction and using the blow molding method described. Similarly, the diameter of the tubular body 11, in any of various cross sectional shapes, may be made as large as desired.

Various modes of carrying out the present invention are contemplated as being within the scope of the following claims particularly pointing out and distinctly claiming the subject matter which is regarded as the invention.

I claim:

1. A molded plastic bird feeder comprising:
   a unitary molded enclosure including a hollow tubular body and integral opposite end caps;
   cooperating attachment means formed with the molded enclosure and adapted to be separated after molding to separate one end cap from the body; and,
   said attachment means adapted to be demountably joined after separation to allow said one end cap to be attached and removed from the body, as for filling.

2. The bird feeder as set forth in claim 1 wherein said enclosure is blow molded.

3. The bird feeder as set forth in claim 1 wherein said attachment means comprises mating screw threads formed in said one end cap and in said body.

4. The bird feeder as set forth in claim 3 wherein said attachment means comprises an annular sleeve forming part of said unitary molded enclosure and joining said mating screw threads prior to separation.

5. The bird feeder as set forth in claim 1 wherein one of said end caps includes a through hole disposed on the longitudinal axis of the tubular body for receipt of a hanger device.

6. The bird feeder as set forth in claim 1 wherein said tubular body includes annular rib means formed adjacent one end thereof, and a circular disc supported by said rib means and adapted to support thereabove a column of seed in said tubular body.

7. The bird feeder as set forth in claim 6 wherein said rib means comprises a single rib extending radially into said tubular body and adapted to support said disc thereon.

8. The bird feeder as set forth in claim 6 wherein said rib means comprises a pair of ribs extending radially into said tubular body, said ribs spaced to define an annular groove therebetween adapted to receive said disc therein with a snap fit.

9. The bird feeder as set forth in claim 1 wherein said cooperating attachment means are provided between both end caps and said tubular body, said attachment means adapted to permit an end cap to be replaced with another tubular body to provide an extended length feeder.

10. The bird feeder as set forth in claim 1 wherein said tubular body includes seed ports molded integrally therein.

11. The bird feeder as set forth in claim 10 wherein each of said seed ports comprises:
    a groove defined by an upper surface and a lower surface joined at their radially inner edges;
    said upper surface comprising a seed deflector hood and said lower surface defining a removable portion to provide a seed port opening.

12. A method for making a bird feeder comprising the steps of:
    (1) molding a unitary plastic enclosure having a hollow tubular body and a pair of end caps, said tubular body and one end cap including molded attachment means;
    (2) separating said one end cap from said unitary enclosure; and,
    (3) engaging said attachment means to demountably attach said separated end cap to said tubular body.

13. The method as set forth in claim 12 wherein said molding step comprises blow molding.

* * * * *